R. T. NEWTON.
VEHICLE.
APPLICATION FILED JULY 5, 1913.
1,251,409.
Patented Dec. 25, 1917.
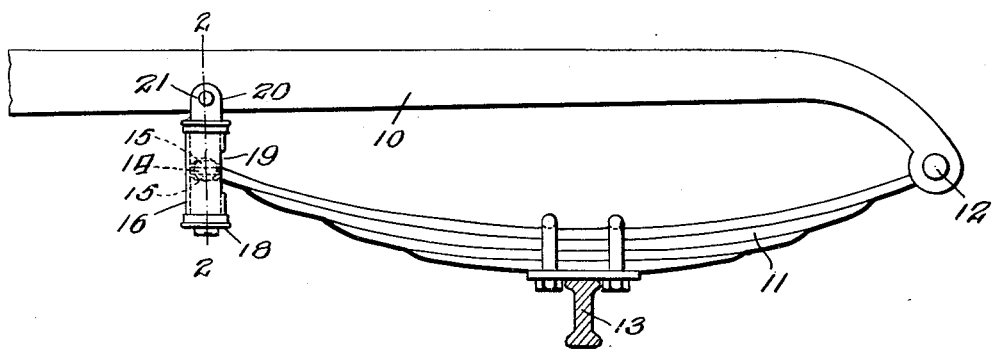
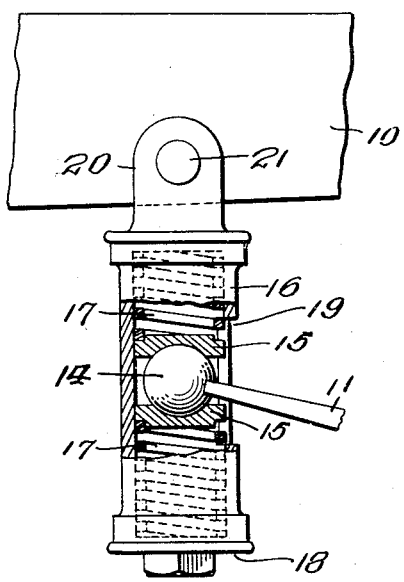
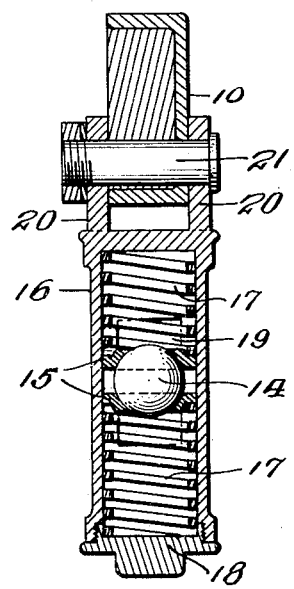
Inventor
Richard T. Newton.
By his Attorney

UNITED STATES PATENT OFFICE.

RICHARD T. NEWTON, OF NEW YORK, N. Y.

VEHICLE.

1,251,409.  Specification of Letters Patent.  Patented Dec. 25, 1917.

Application filed July 5, 1913. Serial No. 777,475.

*To all whom it may concern:*

Be it known that I, RICHARD T. NEWTON, a citizen of the United States, and a resident of New York, in the county of New York and State of N. Y., have invented certain new and useful Improvements in Vehicles, of which the following is a specification.

This invention relates to vehicles provided with shock absorbers or eliminators, and has in view the prevention or neutralization of shocks and vibrations when a wheel of a vehicle passes over a large body, but which also prevents or neutralizes the minor shocks that are caused when the wheels of a vehicle pass over minor objects, and to provide against which is the special and main object of the pneumatic tires. The invention consists of a vehicle provided with casings containing sets of coiled springs and actuating parts all arranged as will now be described, reference being had to the following specification and claims and the drawing in which—

Figure 1 is a side elevation of a portion of a vehicle frame showing one form of the invention, Fig. 2 is a vertical sectional view on the line 2—2 of Fig. 1, and Fig. 3 is a side view partly in section, of a slightly modified form of the socket plates.

Referring to the drawing there is shown a portion of a vehicle frame 10 to which is attached an ordinary flat partly elliptic spring 11, secured by one end pivotally at 12, and resting on the beam 13 being part of the rear axle, not shown, of the vehicle. The other end of the flat spring 11 is rigidly attached to a ball 14, fitting in socket plates 15 which are adapted to slide freely in a cylindrical casing 16. The casing 16 contains the coiled springs 17 and 17', the latter being the weaker of the springs. These springs are actuated by the socket plates 15 as the casing 16 or the ball 14 is moved in either direction. At the bottom of the cylinder 16 is the screw cap 18, and at the side is the slot 19 through which the end of the flat spring 11 moves up and down. From the upper end of the casing 16, extend ears 20 through which passes the pivot 21. It will thus be seen that the casing 16 through the pivot 21 and the ball 14 replaces the link or shackle which ordinarily connects a flat partly elliptic spring with the vehicle frame or an upper flat spring. In Fig. 2 the ball is shown as passing through the socket plates 15, whereas in Fig. 3 the socket plates are shown as imperforate with spherical cavities.

When a vehicle of this kind is used the effect of a shock is the compression of the heavier spring 17, the lighter spring 17' always following so as not only to prevent clicking or noise, but more particularly to prevent shock and deterioration of the spring 17 as it returns to its normal position. The coiled spring 17 is preferably so selected in regard to strength that it acts quickly and easily and therefore materially assists the pneumatic tires of the vehicle and prolongs their lives. On account of the free suspension of the casing 16 on the pivot 21, the casing is capable of assuming an inclined position when the flat spring 11 is more or less straightened out by a shock. This fact, however, does not militate against the correct reciprocation of the springs 17 and 17' because these work before any considerable lateral extension of the flat spring takes place. The ball and socket arrangement formed by the ball 14 and the socket plates 15 therefore works regularly and accurately.

The springs, 17 and 17' are always under tension, which may be regulated by the screw cap 18, and they form contact with the socket plates 15 in peripheral recesses of said plates.

The above description applying to one side of the vehicle is also applicable to the other side, both the sides being symmetrical.

Various modifications of the device, involving the substitution of mechanical equivalents may be made without departing from the spirit of the invention. Thus the socket plates may be connected with the coiled springs, or the coiled springs may be so formed at their interior terminals that the socket plates may be entirely dispensed with. Likewise for the ears 20 and pivot 21 could be substituted a flexible rod or other device to attain flexibility of connection.

What I claim as new is:

1. In a vehicle, the combination of a vehicle frame, a leaf spring at one end attached to the vehicle frame, an upright casing of a shock absorber flexibly connected with the vehicle frame, coiled springs in the casing, and a ball attached to the other terminal of the leaf spring and located between and adapted to actuate the coiled springs.

2. In a vehicle, the combination of a vehicle frame, a leaf spring at one end attached to the frame, a casing of a shock absorber, flexibly connected with the frame, coiled springs in the casing, socket plates against which rest the interior ends of the coiled springs, and a ball attached to the free end of the leaf spring and located between the socket plates.

Signed at New York, in the county of New York and State of N. Y., this 3d day of July, A. D. 1913.

RICHARD T. NEWTON.

Witnesses:
C. A. O. ROSELL,
E. C. DUFF.